(12) United States Patent
Li (10) Patent No.: US 8,770,598 B2
(45) Date of Patent: Jul. 8, 2014

(54) HAND TRUCK WITH ADJUSTABLE WHEEL ASSEMBLY

(76) Inventor: Hong Min Li, Montebello, CA (US)

( * ) Notice: Subject to any disclaimer, the term of this patent is extended or adjusted under 35 U.S.C. 154(b) by 255 days.

(21) Appl. No.: 12/806,421

(22) Filed: Aug. 11, 2010

(65) Prior Publication Data

US 2012/0038123 A1  Feb. 16, 2012

(51) Int. Cl.
*B62B 1/12* (2006.01)
(52) U.S. Cl.
USPC .......................................... 280/40; 280/47.27
(58) Field of Classification Search
USPC ................ 280/651, 652, 654, 47.131, 47.17, 280/47.18, 47.27, 47.24, 47.38, 47.4, 646
See application file for complete search history.

(56) References Cited

U.S. PATENT DOCUMENTS

| | | | | | |
|---|---|---|---|---|---|
| 2,825,574 | A | * | 3/1958 | Williamson | 280/38 |
| 2,856,195 | A | * | 10/1958 | Ziebarth | 280/43 |
| 3,166,339 | A | * | 1/1965 | Earley | 280/654 |
| 3,659,867 | A | * | 5/1972 | Curry | 280/645 |
| 4,314,624 | A | * | 2/1982 | Royet | 190/18 A |
| 4,460,189 | A | * | 7/1984 | Goff | 280/47.27 |
| 4,685,854 | A | * | 8/1987 | Bulle | 414/452 |
| 4,969,660 | A | * | 11/1990 | Spak | 280/646 |
| 5,263,727 | A | * | 11/1993 | Libit et al. | 280/40 |
| 5,984,327 | A | * | 11/1999 | Hsieh et al. | 280/47.24 |
| 6,663,120 | B1 | * | 12/2003 | Fagerqvist | 280/47.27 |
| 6,923,457 | B2 | * | 8/2005 | Nogaki | 280/47.27 |
| 7,140,635 | B2 | * | 11/2006 | Johnson et al. | 280/646 |
| 7,219,903 | B2 | * | 5/2007 | Grooters et al. | 280/47.27 |
| 7,322,586 | B1 | * | 1/2008 | Zettel | 280/47.26 |
| 7,387,306 | B2 | * | 6/2008 | Zimmer | 280/47.29 |
| 7,441,785 | B1 | * | 10/2008 | Tsai | 280/47.29 |
| 7,464,947 | B2 | * | 12/2008 | Cortese | 280/47.27 |
| 7,712,752 | B2 | * | 5/2010 | Horning | 280/47.19 |
| 2002/0163164 | A1 | * | 11/2002 | Shapiro et al. | 280/651 |

* cited by examiner

*Primary Examiner* — Katy M Ebner
(74) *Attorney, Agent, or Firm* — Raymond Y. Chan; David and Raymond Patent Firm (57) ABSTRACT

A hand truck includes a frame body and a wheel assembly including two wheel units spacedly supported at the frame body to switch between a first operation position and a second operation position for enabling the frame body to be tilted backward to transport a load. In the first operation position, the wheel units are oriented in parallel planes for enabling the frame body to move in a back-and-forth direction, and in the second operation position, the wheel units are oriented to align with each other in a common plane for enabling the frame body to move in a left-and-right direction. Therefore, the hand truck provides two modes of movement for two-dimensional movement.

14 Claims, 7 Drawing Sheets

HAND TRUCK WITH ADJUSTABLE WHEEL ASSEMBLY

BACKGROUND OF THE PRESENT INVENTION

1. Field of Invention

The present invention relates to a dolly with adjustable wheel assembly, and more particularly to a dolly with adjustable wheel assembly which provides movement of the dolly along two perpendicular axes.

2. Description of Related Arts

Hand trucks, such as dollies and four-wheeled transportation boards, are commonly used for carrying and transporting a load, especially heavy and bulky load, from one place to another. One type of conventional dolly includes a frame for holding a load and two wheels for movement along the axis of the frame. When a user uses the dolly to transport a heavy load and has to make a turn, the whole dolly, which includes the frame and the wheels, has to be turned together. That is to say, the user has to hold and turn the dolly which carries the heavy load in order to make a turn.

There are some major drawbacks for this kind of conventional dolly. First, the user has to turn the heavy load on the dolly when making a turn and without any displacement and without making any progress of movement. Second, the heavy load may be dislodged from its original position and collapsed while making a turn. Third, when the load is bulky and the space is not sufficient for making a turn, a user has to unload and adjust the position of the heavy and bulky load manually and reposition the dolly with respect to the load. For example, a rectangular bulky load is carried with the dolly across a L-shaped corridor. When the user approaches the corner of the L-shaped corridor, he or she has to unload and reposition the bulky load at the corner, and then moves the dolly to fit the load in order to pass through the corner. The lack of any mechanism in the conventional dolly to facilitate movement in two perpendicular directions makes it really inconvenience and ineffective as a transportation tool. Since building structures, either residential or commercial, usually will not provide a huge corridor and cannot avoid having corner points in the building structures, the need of making a turn at the corner is real and the problem of failing to provide any mechanism to solve the problem is a vital drawback.

Another type of hand truck is a four-wheeled transportation board, which is very primitive in the sense that there is no mechanism to secure a load on the transportation board and no handle or navigation means for the user to hold and move the board around, or to stop the board. There is simply no control or handle arrangement for this kind of four-wheeled transportation board.

SUMMARY OF THE PRESENT INVENTION

The invention is advantageous in that it provides a hand truck which includes a wheel assembly for providing two modes of movement such that the hand truck is capable of providing two-dimensional movement.

Another advantage of the invention is to provide a hand truck which comprises a wheel assembly comprising two wheel units being controlled to switch and lock into two different positions to move at two different perpendicular axes of the hand truck.

Another advantage of the invention is to provide a hand truck, wherein the two wheel units are selectively switched between the first and second operation positions in a hands-free manner.

Another advantage of the invention is to provide a hand truck, which does not require altering the original structural design of the hand truck, so as to minimize the manufacturing cost of the hand truck incorporating with the adjustable wheel assembly.

Another advantage of the invention is to provide a hand truck, wherein no expensive or complicated structure is required to employ in the present invention in order to achieve the above mentioned objects. Therefore, the present invention successfully provides an economic and efficient solution for not only providing a rigid configuration for the hand truck to carry and transport the load but also enhancing the practical use of the hand truck with two different directional movements.

Additional advantages and features of the invention will become apparent from the description which follows, and may be realized by means of the instrumentalities and combinations particular point out in the appended claims.

According to the present invention, the foregoing and other objects and advantages are attained by a hand truck, comprising:

a frame body, having a L-shaped cross section, comprising a load platform for carrying a load thereon, and a handle upwardly extended from the load platform; and a wheel assembly which comprises two wheel units spacedly supported at the handle of the frame body to switch between a first operation position and a second operation position for enabling the frame body to be tilted backward to transport the load, wherein in the first operation position, the wheel units are oriented in parallel planes for enabling the frame body to move in a back-and-forth direction, and in the second operation position, the wheel units are oriented to align with each other in a common plane for enabling the frame body to move in a left-and-right direction.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
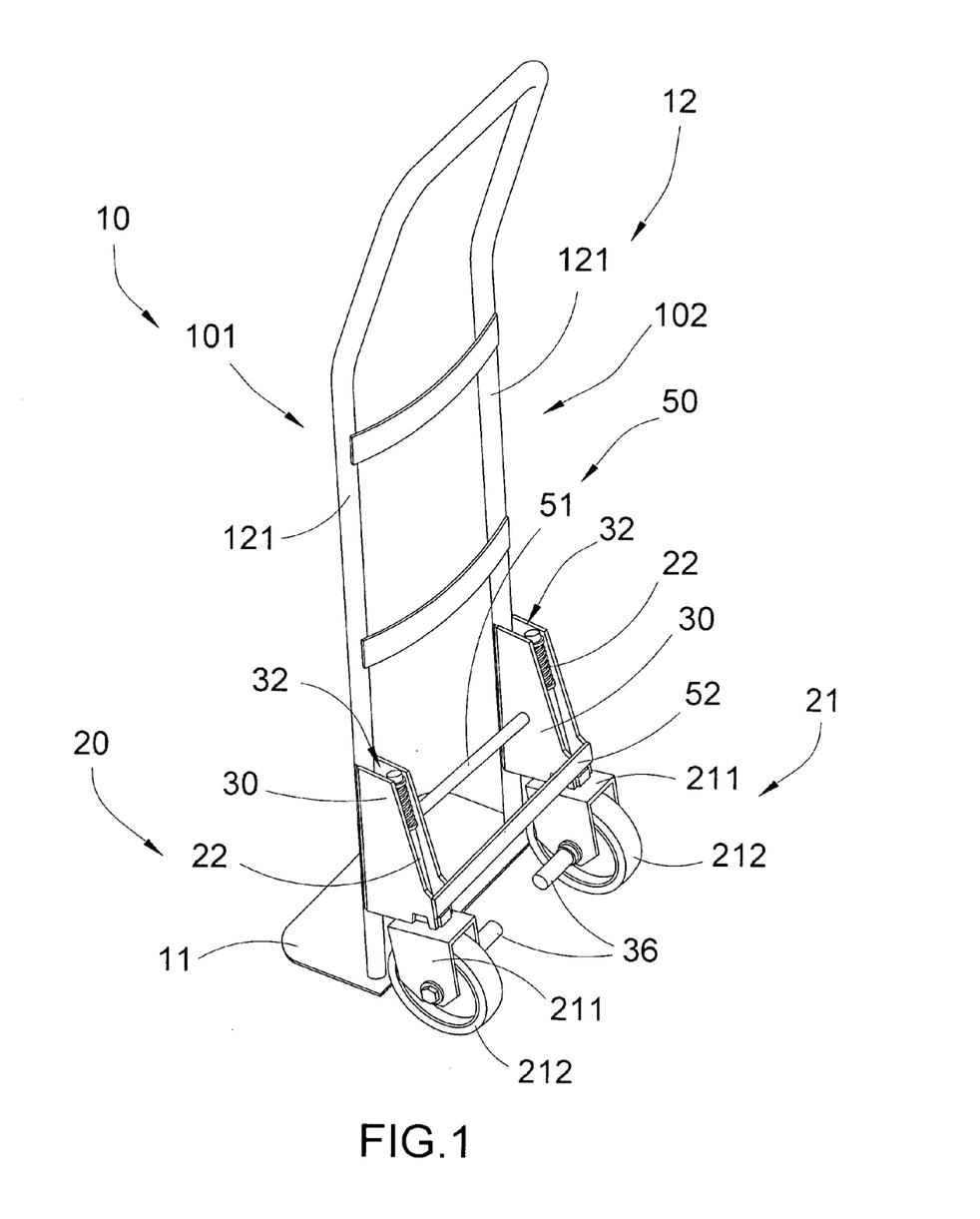
FIG. 1 is perspective view of a hand truck according to a preferred embodiment of the present invention.

Referring to FIG. 1 of the drawings, a hand truck, such as a dolly, according to a preferred embodiment of the present invention is illustrated, wherein the hand truck comprises a frame body 10 and an adjustable wheel assembly 20 provided at the frame body 10 for providing two dimensional movements. Therefore, the hand truck can be moved in a first direction and a second direction which is perpendicular to the first direction. In other words, the hand truck can be moved back-and-forth, or left-and-right as desired.

As shown in FIG. 1, the frame body 10, having a generally L-shaped cross-section, comprises a load platform 11 for carrying a load thereon, and a handle 12 upwardly extended from the load platform 11. Accordingly, the frame body 10 defines a front side 101 that the load platform 11 is frontwardly extended from the handle 12, and a rear side 102 that a user is able to stand at the rear side 102 of the handle 12 to operate the hand truck. The handle 12 preferably comprises two parallel handle members 121, wherein upper portions of the handle members 121 form a handle portion of the frame body 10 while the load platform 11 is extended from lower portions of the handle members 121.

Figure 2A:
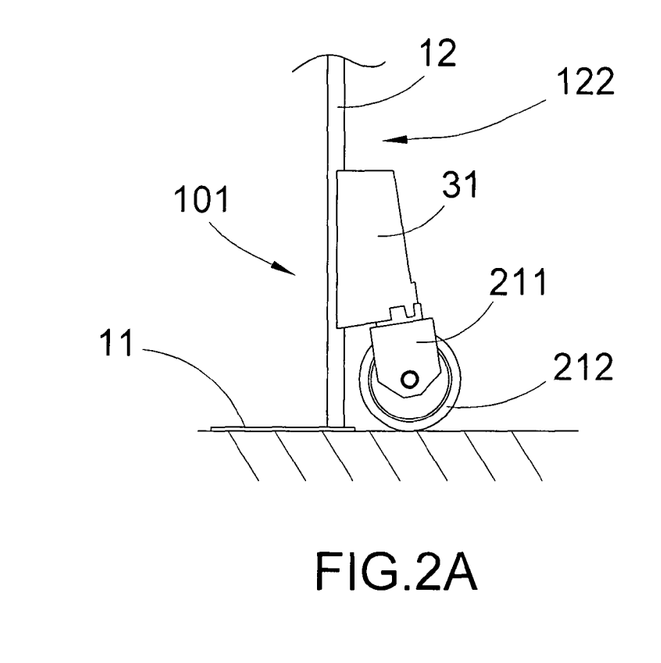
FIGS. 2A and 2B are side views of the hand truck according to the above preferred embodiment, illustrating two different operation positions of the wheel units.
Figure 2B:
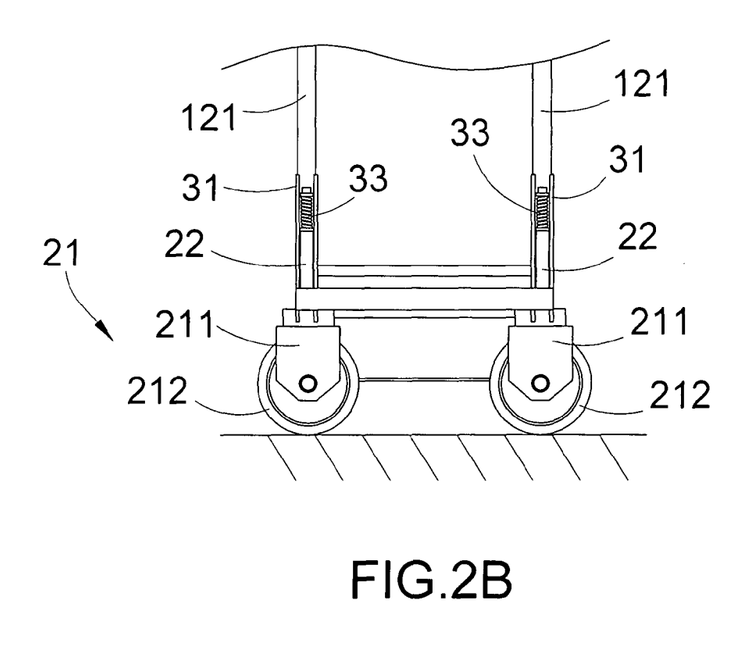

The adjustable wheel assembly comprises two wheel units 20 spacedly supported at the handle 12 of the frame body 10 to switch between a first operation position and a second operation position for enabling the frame body 10 to be tilted backward to transport the load. Accordingly, in the first operation position, as shown in FIG. 2A, the wheel units 20 are oriented in parallel planes for enabling the frame body 10 to move in a back-and-forth direction. In the second operation position, as shown in FIG. 2B, the wheel units 20 are oriented to align with each other in a common plane for enabling the frame body 10 to move in a left-and-right direction. In other words, the frame body 10 can be selectively moved in two dimensional directions.

Accordingly, the wheel units 20 are located at two outer sides of the frame body 10 to maximize the distance between the wheel units 20 so as to enhance the stability of the hand truck during the transportation. In particular, the wheel units 20 are located at the rear side 102 of the handle members 121 of the frame body 10 respectively.

Each of the wheel units 20 comprises a steerable wheel 21 and a switching shaft 22 which is upwardly extended from the steerable wheel 21 and is adjustably rotated with respect to the frame body 10. Therefore, when the steerable wheels 21 are oriented in parallel planes in the first operation position, the frame body 10 is adapted to be moved in the back-and-forth direction, and when the steerable wheels 21 are oriented in an aligned common planar manner in the second operation position, the frame body 10 is adapted to be moved in the left-and-right direction. In particular, each of the wheel units 20 is turned 90 degrees to switch between the first and second operation positions.

In addition, each of the steerable wheel 21 comprises a wheel housing 211, preferably having a U-shaped cross section, and a wheel member 212 rotatably held at the wheel housing 211, wherein the switching shaft 22 is upwardly extended from the wheel housing 211 of the steerable wheel 21 such that when the switching shaft 22 is rotated, the wheel member 212 of the steerable wheel 21 is driven to rotate correspondingly. In other words, in the first operation position, the wheel members 212 are coaxial and parallel with each other and are located at the outer sides of the frame body 10 at the rear side 102 thereof such that the frame body 10 can be moved in the back-and-forth direction. In the second operation position, the wheel members 212 are aligned side-by-side at the outer sides of the frame body 10 at the rear side 102 thereof such that the frame body 10 can be moved in the left-and-right direction, i.e. the sideward direction of the frame body 10.

As it is mentioned above, the frame body 10 is preferably tilted backward in order for the user to move the frame body 10 in the back-and-forth direction. Each of the switching shafts 22 is inclinedly supported with respect to the handle 12 of the frame body 10 to allow the frame body 10 to be tilted backward for transporting the load. Since the switching shafts 22 are inclinedly supported at the rear side 102 of the frame body 10 when the frame body 10 is moved in an upright position, the switching shafts 22 can be moved perpendicular to the ground surface when the frame body 10 is tilted backward.

It is worth mentioning that when the frame body 10 is tilted backward, the frame body 10 can be moved in the back-and-forth direction when the wheel units 20 are switched in the first operation position, or can be moved in the left-and-right direction when the wheel units 20 are switched in the second operation position.

Figure 3A:
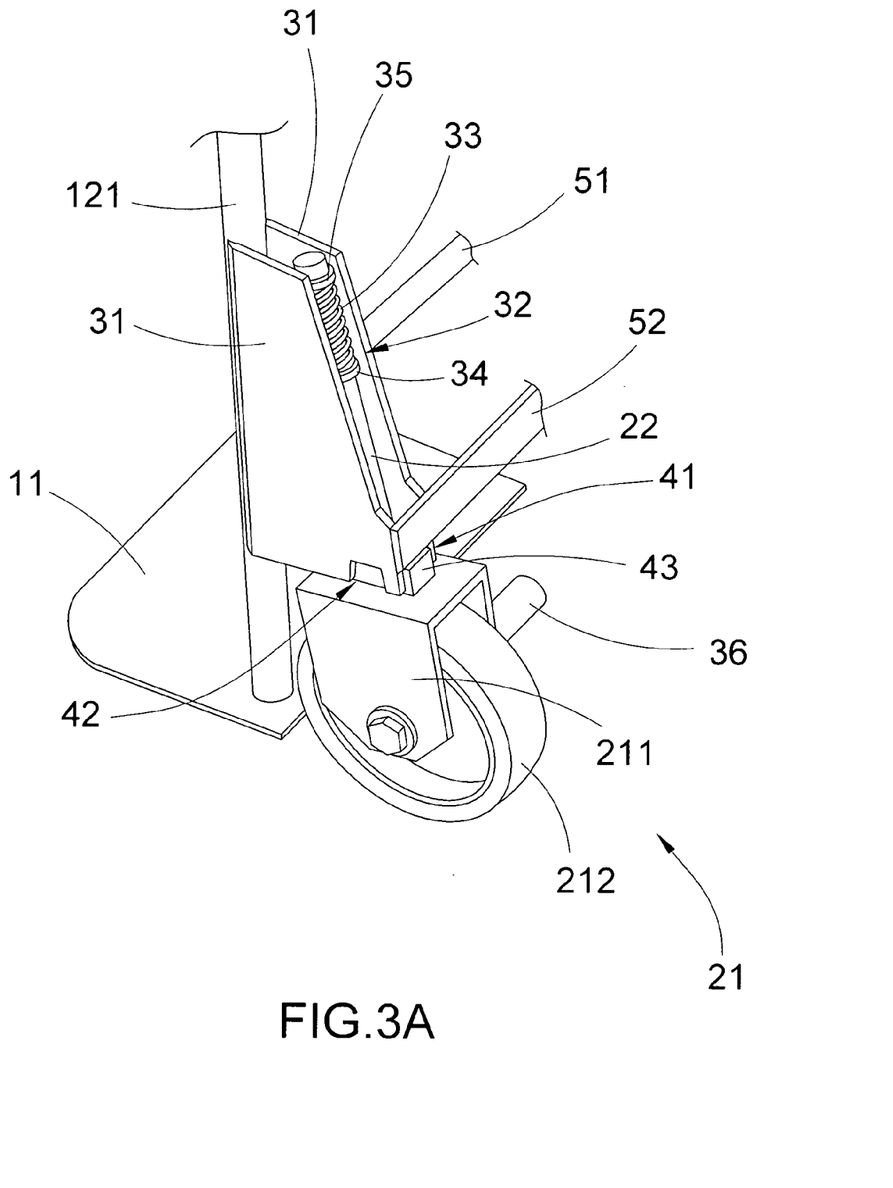
FIGS. 3A, 3B and 3C illustrate a switching operation of the wheel units according to the above preferred embodiment of the present invention.
Figure 3B:
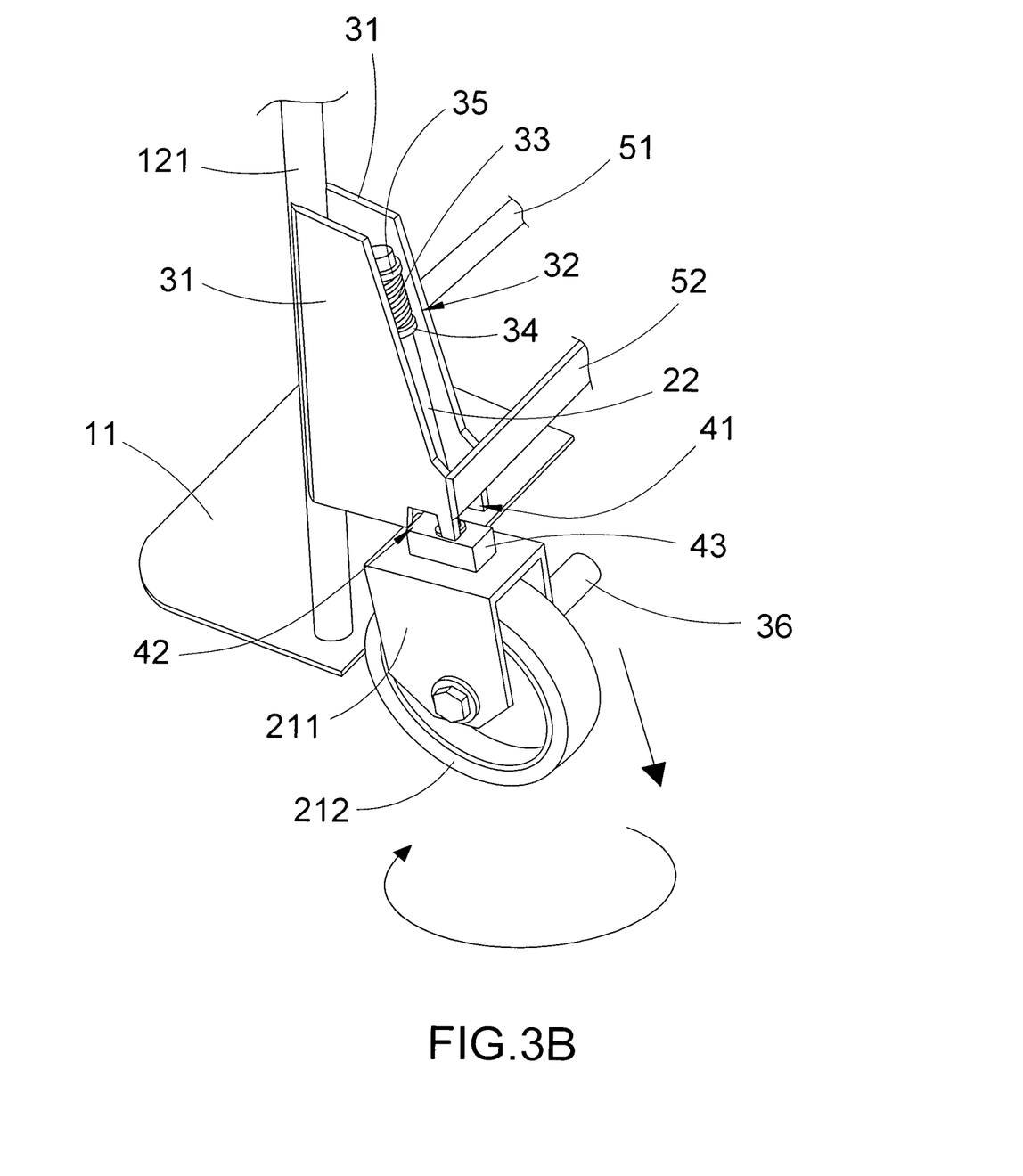
Figure 3C:
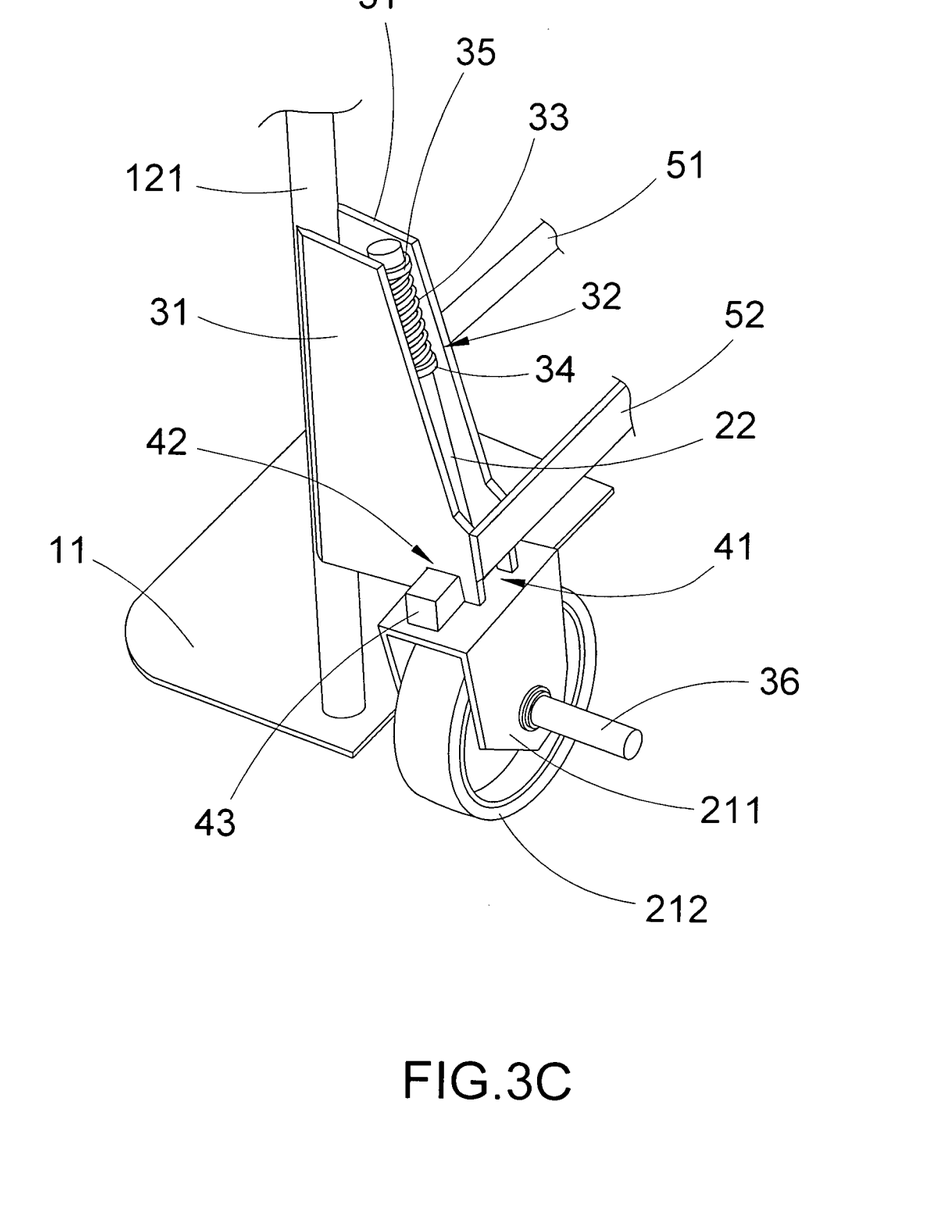

The wheel assembly further comprises two wheel frames 30 spacedly and rearwardly extended from the frame body 10 for retaining the wheel units 20 in position. Accordingly, the wheel frames 30 are rearwardly extended from the handle members 121 of the frame body 10 respectively. As shown in FIGS. 3A to 3C, each of the wheel frames 30 comprises two retention walls 31 rearwardly extended from the handle 12 at the respective outer side thereof to define a guiding channel 32 between the retention walls 31. The switching shaft 22 is rotatably received in the respective guiding channel 32 to enable the wheel units 20 to be switched between the first and second operation positions.

The two retention walls 31 are embodied as an outer retention wall and an inner retention wall which preferably parallels to the outer retention wall. Each of the retention walls 31 has a front edge extended from the rear side 102 of the frame body 10 and a slanted rear edge such that each of the retention walls 31 has a trapezoid shape. Accordingly, the switching shaft 22 is received along the guiding channel 32 between the outer and inner retention walls 31 at a position that the switching shaft 22 is aligned with the slanted rear edge of each of the retention walls 31.

It is worth mentioning that each of the guiding channels 32 has a bottom opening formed between the bottom sides of the retention walls 31 such that each of the steerable wheels 21 is located underneath the respective wheel frame 30.

The wheel assembly further comprises two retention units 40 for retaining the wheel units 20, respectively, while the wheel assemblies are in the first and second operation positions, wherein each of the retention units 40 forms a position lock to lock up the respective wheel unit 20 between the first and second operation positions.

As shown in FIGS. 3A to 3C, each of the retention unit 40 has a first locking slot 41 formed between the retention walls 31 and a second locking slot 42 formed at a bottom edge of one of the respective retention walls 31. Accordingly, the first locking slot 41 is formed at the bottom side of the respective wheel frame 30 at a position between two slanted rear edges of the retention walls 31. The second locking slot 41 is preferably formed at the bottom edge of the outer retention wall 31.

The retention unit 40 further comprises a retention member 43 upwardly protruded from the respective steerable wheel 31, wherein when the switching shaft 22 is rotated to move the retention member 43 to the first locking slot 41, the steerable wheel 21 is switched and locked in the first operation position. When the switching shaft 22 is rotated to move the retention member 43 to the second locking slot 42, the steerable wheel 21 is switched and locked in the second operation position. Accordingly, the retention member 43 has a block-like structure, such as a cube structure, a rectangular block, a hexagonal block or the like.

As shown in FIGS. 3A to 3C, the retention member 43 is upwardly extended from the wheel housing 211 of the steerable wheel 21, wherein the retention member 43 has a shape and size matching with each of the first and second locking slots 41, 42.

In particular, each of the switching shafts 22 is slidably and rotatably retained in the respective guiding channel 32 such that each of the steerable wheels 21 is adapted to be downwardly pushed to disengage the retention member 43 from each of first and second locking slots 41, 42 so as to enable the steerable wheel 21 to be switched between the first and second operation positions. As shown in FIG. 3A, the steerable wheel 21 is locked in the first operation position that the retention member 43 is engaged with the first locking slot 41.

In order to switch the steerable wheel 21 from the first operation position to the second operation position, the steerable wheel 21 is downwardly pressed to drive the respective switching shaft 22 moving downwardly within the guiding channel 32 so as to disengage the retention member 43 from the first locking slot 41. Once the retention member 43 is dropped down at a position below the bottom edge of the outer retention wall 31, the steerable wheel 21 can be turned with respect to the rotational movement of the switching shaft 22 within the guiding channel 32, as shown in FIG. 3B. When the steerable wheel 21 is turned to align the retention member 43 with the second locking slot 42, the downward pressing force at the steerable wheel 21 can be released. Therefore, the steerable wheel 21 will be lifted upward to engage the retention member 43 with the second locking slot 42 so as to lock up the steerable wheel 21 in the second operation position, as shown in FIG. 3C. In other words, the hand truck, or the dolly can be moved back and forth, or left and right without rotating the frame body 10, as desired.

It is worth mentioning that the height of the retention member 43 is about 1 cm and the depth of each of the first and second locking slots 41, 42 is about 1 cm. In other words, the steerable wheel 21 can be downwardly pressed with a displacement of 1 cm in order to disengage the retention member 43 with each of the first and second locking slots 41, 42. In addition, since each of the wheel units 20 is supported at an inclined position when the frame body 10 is moved at the upright position, there is a clearance between each of the wheel units 20 and the ground surface for enabling the wheel unit 20 to be moved downwardly for switching the wheel unit 20 between the first and second operation positions. When the frame body 10 is moved in the upright position, the weight of the load is substantially applied at the load platform 11 of the frame body 10 but not at the wheel units 20. Therefore, the user is able to easily press each of the wheel units 20 downward for switching its position by the downward pushing force in no relation to the weight of the load. Thus, the two wheel units 20 are rearwardly located at the rear side 102 of the frame body 10, such that the wheel units 20 form two rear stands for supporting on the ground surface when the frame body 10 is moved in the upright position. The wheel units 20 further form two pivot points to move the frame body 10 from the upright position to the tilted position with minimum rear pulling force at handle 12 of the frame body 10 by the user.

In order to enhance the switching operation of each of the steerable wheel 21, each of the wheel frames 30 further comprises a resilient element 33 coaxially coupling with an upper portion of the respective switching shaft 22 for applying an upward pulling force thereat so as to ensure the retention member 43 being engaged with one of the first and second locking slots 41, 42. As shown in FIG. 3A, the resilient element 33 is embodied as a compression spring coaxially coupling with the upper portion of the switching shaft 22 within the guiding channel 32. A lower affixing holder 34 is affixed to a surrounding wall of the guiding channel 32 and is coaxially and slidably coupled with the switching shaft 22. An upper movable holder 35 is slidably coupled with the surrounding wall of the guiding channel 32 and is coaxially coupled with the switching shaft 22. Accordingly, the resilient element 33 is supported between the lower affixing holder 34 and the upper movable holder 35 at a position that the lower and upper ends of the resilient element 33 bias against the lower affixing holder 34 and the upper movable holder 35 respectively. Therefore, when the switching shaft 22 is slid downwardly within the guiding channel 32, the resilient element 33 will be compressed. When the downward pressing force at the steerable wheel 21 is released, the resilient element 33 will be restored to its original form to apply the upward pulling force against the switching shaft 22. In other words, the upward pulling force of the resilient element 33 will ensure the retention member 43 to be engaged with one of the first and second locking slots 41, 42 so as to ensure the steerable wheel 21 being locked in one of the first and second operation positions.

According to the preferred embodiment, the wheel assembly 30 further comprises two foot pedals 36 sidewardly extended from the wheel units 21 respectively to selectively switch each of the wheel units 21 between the first and second operation positions in a hands-free manner.

Accordingly, each of the foot pedals 36 is an elongated foot step sidewardly extended from the wheel member 212 at the center thereof. The foot pedal 36 is arranged for the user to step thereon for applying the downward force at the steerable wheel 21. Therefore, when the frame body 10 is moved in the upright position, the user is able to apply the downward force at the steerable wheel 21 by the foot of the user to switch the steerable wheel 21 between the first and second operation positions. It is appreciated that the user is able to slightly push the frame body 10 forward by hands of the user to minimize the downward force applied at the foot pedal 36 by the foot of the user. Preferably, the two wheel units 21 are identical in structure except the provision of the foot pedals 36.

The wheel assembly further comprises a reinforcing frame 50 for reinforcing the structure of the wheel units 20 with respect to the frame body 10. The reinforcing frame 50 comprises a first reinforcing arm 51 extending between two inner retention walls 31 of the two wheel frames 30 and a second reinforcing arm 52 extending between two outer retention walls 31 of the two wheel frames 30.

Figure 4:
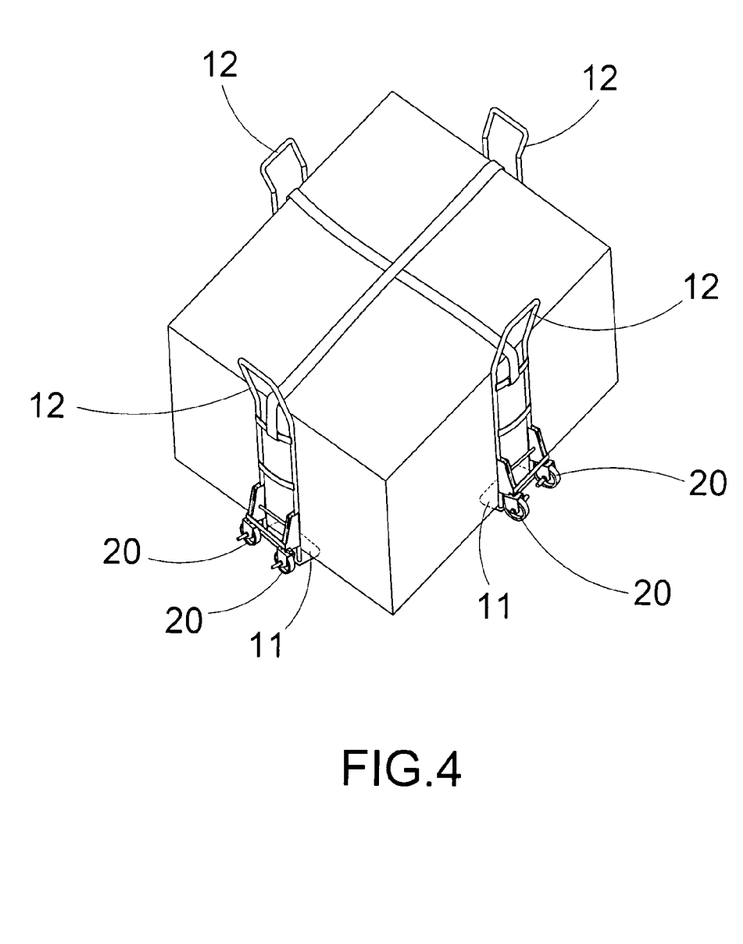
FIG. 4 illustrates an alternative use of the hand truck to move a large and bulky object according to the above preferred embodiment of the present invention.

Referring to FIG. 4 of the drawings, since the hand truck of the present invention provides two different operation positions for two-dimensional movement, two or more of the hand trucks of the present invention can be co-operatively used together to carry a big and bulky load. For example, as shown in FIG. 4, four hand trucks can be used for all four sides of the load, wherein two hand trucks are set in the first operation position that the two hand trucks are positioned at two longitudinal sides of the loads respectively. The other two hand trucks are set in the second operation position that the two hand trucks are positioned at two transverse sides of the loads respectively. Therefore, the load can be moved in either back-and-forth direction or left-and-right direction. It is worth mentioning that the handles 12 of the hand trucks form four boundary frames of the load such that by tightening the handles 12 together via a cable or the like, the load can be securely retained and supported by the hand trucks. Since the hand trucks are located at four sides of the load respectively, any size of the load can fit to be supported by the hand trucks without the limitation of the supporting surface of the hand truck.

Figure 5:
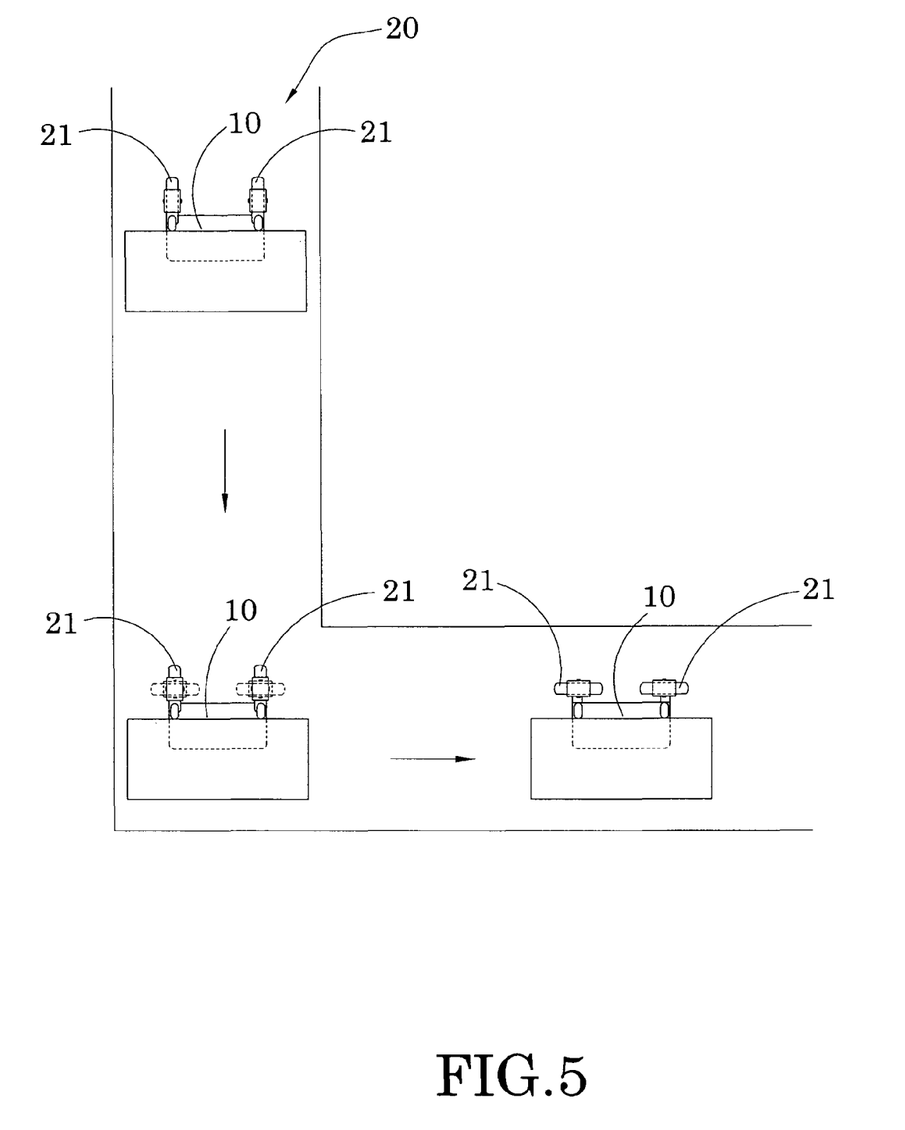
FIG. 5 illustrates the operation of the hand truck for cornering according to the above preferred embodiment of the present invention.

FIG. 5 illustrates the operation of the hand truck for cornering without repositioning the orientation of the frame body 10. As shown in FIG. 5, the load is placed at the frame body 10 while the steerable wheels 21 of the wheel assembly 20 are shifted in the first position. Therefore, the hand truck can be moved in the back-and-forth direction. During cornering, the frame body 10 will be remained at the same orientation while the steerable wheels 21 of the wheel assembly 20 are shifted in the second position. Therefore, the hand truck can be moved in the left-and-right direction. It is worth mentioning that the user does not have to dislodge the load at the frame body 10 or turn the frame body 10 for cornering. By switching the steerable wheels 21 of the wheel assembly 20 between the first and second positions, the frame body 10 can be moved at any narrow corridor.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A hand truck, comprising:
a frame body, having a L-shaped cross section, comprising a load platform for carrying a load thereon, and a handle upwardly extended from said load platform, wherein said handle comprises two parallel handle members; and
a wheel assembly which comprises:
two wheel frames rearwardly extended from said handle members respectively, wherein each of said wheel frames comprises two retention walls rearwardly extended from said respective handle member of said handle to define a guiding channel between said retention walls; and
two wheel units spacedly supported at said handle of said frame body, wherein each of said wheel units comprises a wheel housing, a wheel member rotatably held at said wheel housing, and a switching shaft upwardly extended from said wheel housing, wherein said switching shafts of said wheels units are rotatably received in said guiding channels respectively to move said wheel members between a first operation position and a second operation position, wherein each of said wheel frames further comprises a first locking slot defined between said two retention walls, a second locking slot formed at a bottom edge of one of said respective retention walls, and a retention member upwardly protruded from said respective wheel housing, wherein in said first operation position, said switching shafts are rotated in said guiding channels until said wheel members are oriented in parallel planes for enabling said frame body to move in a back-and-forth direction, wherein said wheel unit is retained in said first operation position when said retention member is moved at said first locking slot between said retention walls, wherein in said second operation position, said switching shafts are rotated in said guiding channels until said wheel members are oriented to align with each other in a common plane for enabling said frame body to move in a left-and-right direction, wherein said wheel unit is retained in said second operation position when said retention member is moved at said second locking slot at said bottom edge of said respective retention wall.

2. The hand truck, as recited in claim 1, wherein each of said switching shafts is inclinedly supported in said guiding channel with respect to said handle of said frame body for enabling said switching shafts to be shifted between said first and second operation positions with minimum displacement.

3. The hand truck, as recited in claim 1, wherein said two retention walls of each of said wheel frames are outer and inner retention walls respectively, wherein said second locking slot is formed at said bottom edge of said outer retention wall.

4. The hand truck, as recited in claim 2, wherein said two retention walls of each of said wheel frames are outer and inner retention walls respectively, wherein said second locking slot is formed at said bottom edge of said outer retention wall.

5. The hand truck, as recited in claim 3, wherein each of said switching shafts is slidably and rotatably retained in said respective guiding channel such that each of said wheel units is downwardly pushed below said bottom edge of said outer retention wall to disengage said retention member from each of said first and second locking slots so as to enable said wheel unit to be switched between said first and second operation positions.

6. The hand truck, as recited in claim 4, each of said switching shafts is slidably and rotatably retained in said respective guiding channel such that each of said wheel units is downwardly pushed below said bottom edge of said outer retention wall to disengage said retention member from each of said first and second locking slots so as to enable said wheel unit to be switched between said first and second operation positions.

7. The hand truck, as recited in claim 5, wherein each of said wheel frames further comprises a resilient element which is received in said guiding channel and is coaxially coupled with an upper portion of each of said switching shafts for applying an upward pulling force thereat so as to ensure said retention member is engaged with one of said first and second locking slots.

8. The hand truck, as recited in claim 6, wherein each of said wheel frames further comprises a resilient element which is received in said guiding channel and is coaxially coupled with an upper portion of each of said switching shafts for applying an upward pulling force thereat so as to ensure said retention member is engaged with one of said first and second locking slots.

9. The hand truck, as recited in claim 1, wherein each of said retention walls, which is formed in a trapezoid shape, has a front edge extended from a rear side of said frame body and a slanted rear edge, wherein each of said guiding channels has a bottom opening, wherein said wheel housing and said wheel member are located under said bottom edges of said retention walls, wherein said first locking slot is formed at a bottom side of said respective wheel frame at a position between said two slanted rear edges of said retention walls, wherein said switching shaft is received along said guiding channel between said two retention walls at a position that said switching shaft is aligned with said slanted rear edge of each of said retention walls.

10. The hand truck, as recited in claim 4, wherein each of said retention walls, which is formed in a trapezoid shape, has a front edge extended from a rear side of said frame body and a slanted rear edge, wherein each of said guiding channels has a bottom opening, wherein said wheel housing and said wheel member are located under said bottom edges of said retention walls, wherein said first locking slot is formed at a bottom side of said respective wheel frame at a position between said two slanted rear edges of said retention walls, wherein said switching shaft is received along said guiding channel between said two retention walls at a position that said switching shaft is aligned with said slanted rear edge of each of said retention walls.

11. The hand truck, as recited in claim 8, wherein each of said retention walls, which is formed in a trapezoid shape, has a front edge extended from a rear side of said frame body and a slanted rear edge, wherein each of said guiding channels has a bottom opening, wherein said wheel housing and said wheel member are located under said bottom edges of said retention walls, wherein said first locking slot is formed at a bottom side of said respective wheel frame at a position between said two slanted rear edges of said retention walls, wherein said switching shaft is received along said guiding channel between said two retention walls at a position that said switching shaft is aligned with said slanted rear edge of each of said retention walls.

12. The hand truck, as recited in claim 1, wherein said wheel assembly further comprises two foot pedals sidewardly extended from centers of said wheel members respectively to selectively switch each of said wheel units between said first and second operation positions in hands-free manner.

13. The hand truck, as recited in claim 6, wherein said wheel assembly further comprises two foot pedals sidewardly extended from centers of said wheel members respectively to selectively switch each of said wheel units between said first and second operation positions in hands-free manner.

14. The hand truck, as recited in claim 11, wherein said wheel assembly further comprises two foot pedals sidewardly extended from centers of said wheel members respectively to selectively switch each of said wheel units between said first and second operation positions in hands-free manner.

\* \* \* \* \*